Jan. 30, 1968   R. ANDERSEN ETAL   3,365,888
POWER PLANTS
Original Filed Feb. 20, 1964   5 Sheets-Sheet 1

INVENTORS
ROLF ANDERSEN
NIELS LAURSEN
BY Dicke & Craig
ATTORNEYS

United States Patent Office 3,365,888
Patented Jan. 30, 1968

3,365,888
POWER PLANTS
Rolf Andersen, Copenhagen-Gentofte, and Niels Laursen, Copenhagen-Skovlunde, Denmark, assignors to Scan-process A/S, Copenhagen-Naerum, Denmark, a corporation of Denmark
Continuation of application Ser. No. 346,198, Feb. 20, 1964. This application Sept. 23, 1966, Ser. No. 581,658
Claims priority, application Great Britain, Feb. 21, 1963, 7,102/63
38 Claims. (Cl. 60—67)

ABSTRACT OF THE DISCLOSURE

A power plant and a method of operating a power plant having a steam generator and a turbine system employing a plurality of turbine cylinders operable at relatively different steam pressures. First steam is produced by the generator and operates a turbine cylinder operable at a relatively high pressure. The first steam is withdrawn from the high pressure cylinder at the outlet end and condensed in a heat exchanger. The heat of condensation is used to evaporate water and produce a second different steam that operates a following turbine cylinder of relatively lower pressure. The second steam is withdrawn from the outlet of the lower pressure cylinder and eventually condensed into distilled water. The distilled water is withdrawn for use outside of the power plant. At no time, is the first steam or its condensate in contact directly with the second steam or its condensate.

---

This application is a continuation of applicant's prior application Ser. No. 346,198, filed Feb. 20, 1964, now abandoned.

It is the purpose of the invention to provide a power plant of this type having means for keeping the wetness of the steam below allowable limits and being operable to utilize the losses which otherwise would occur especially to produce distilled water.

It is a further purpose of the invention to provide a power plant of the type hereinbefore referred to in which the steam is expanded through a plurality of turbine cylinders operating in series with decreased temperature and pressure and in which between two cylinders where the wetness fraction of the steam becomes beyond what is considered allowable for using the steam in the next following turbine cylinder, the steam is condensed and the condensation heat is used for producing new steam to be supplied to the next following turbine cylinder.

Still a further purpose of the invention is to provide a steam generator and turbine power plant having a plurality of turbine cylinders operating in series in which between two cylinders steam with too high wetness fraction is replaced by substantially dry steam produced in an auxiliary equipment operatively connected between said cylinders and in which substantially the steam produced in said equipment is recovered in the form of distilled water.

Still a further purpose of the invention is to provide an economic production of a substantial amount of distilled water by utilizing a substantial part of such losses which otherwise would arise due to the necessity of increasing the dryness fraction of the steam such as by reheating or water separation.

Still further purposes and advantages of the present invention will occur from the following description of the invention by way of examples.

Figure 1:
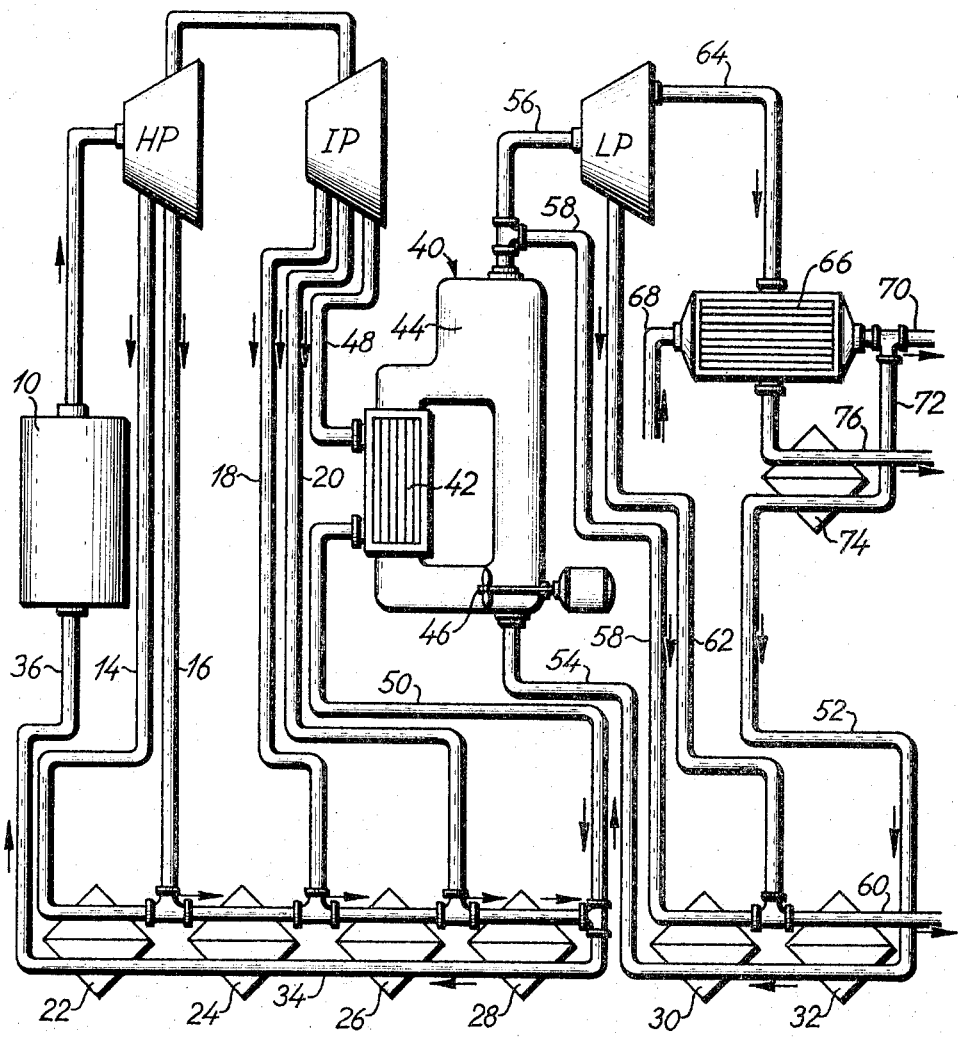
Figure 2:
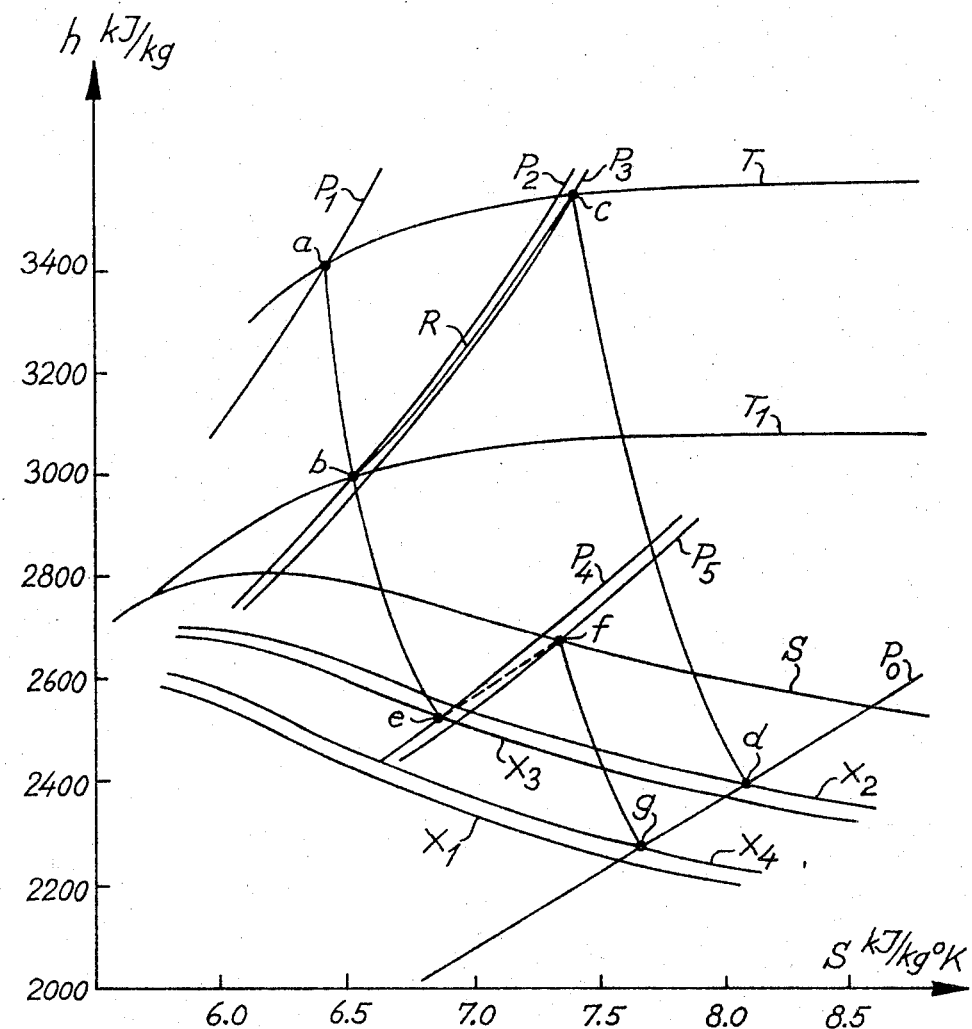
Figure 3:
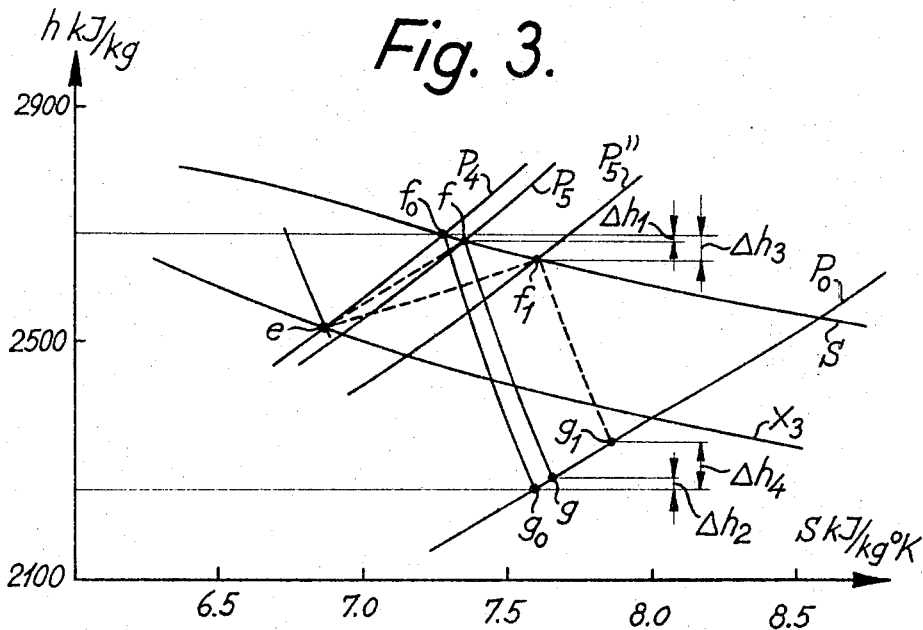
Figure 4:
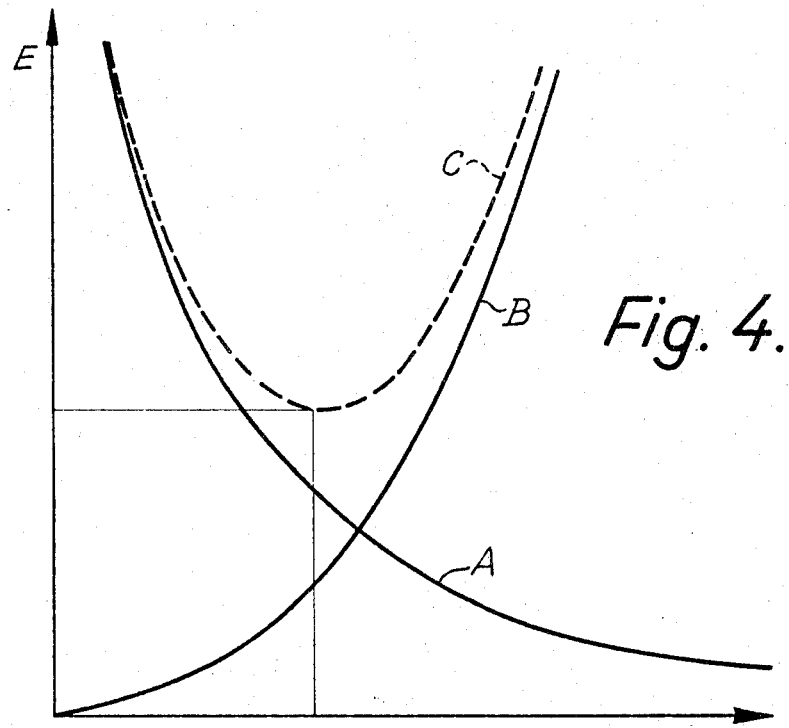
Figure 5:
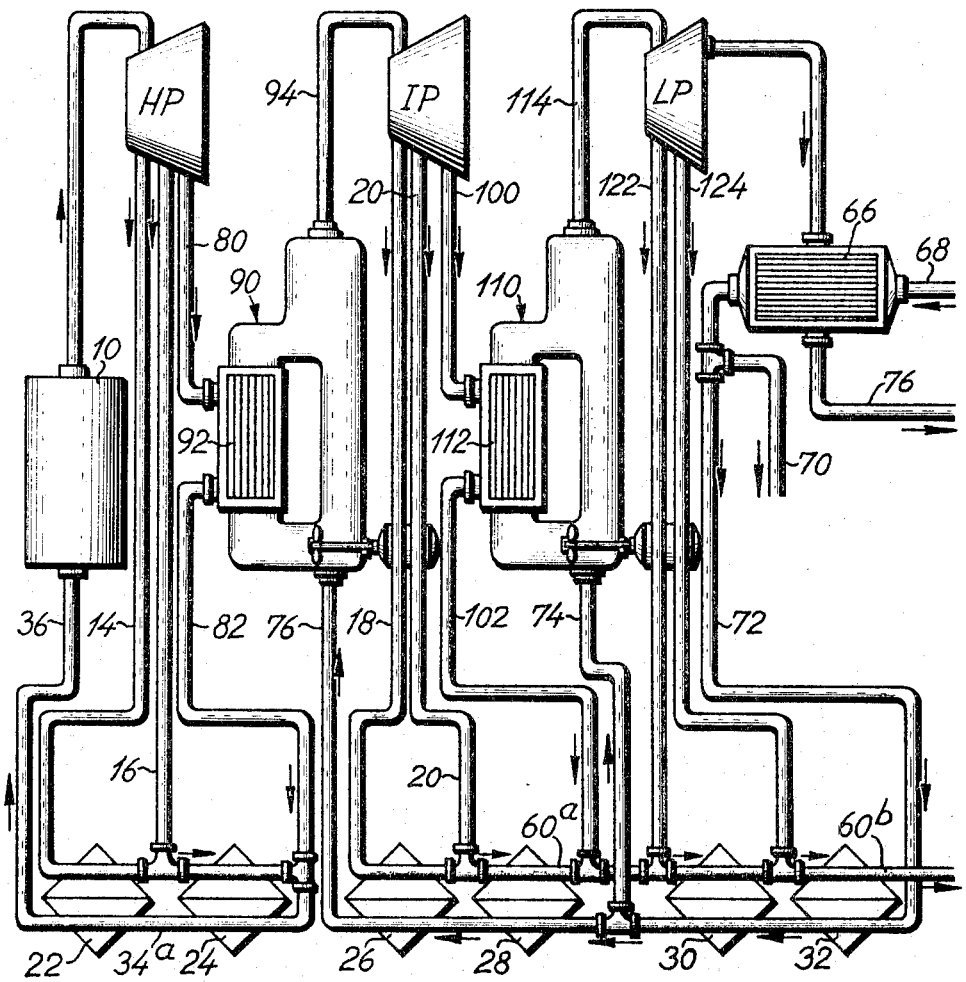
Figure 6:
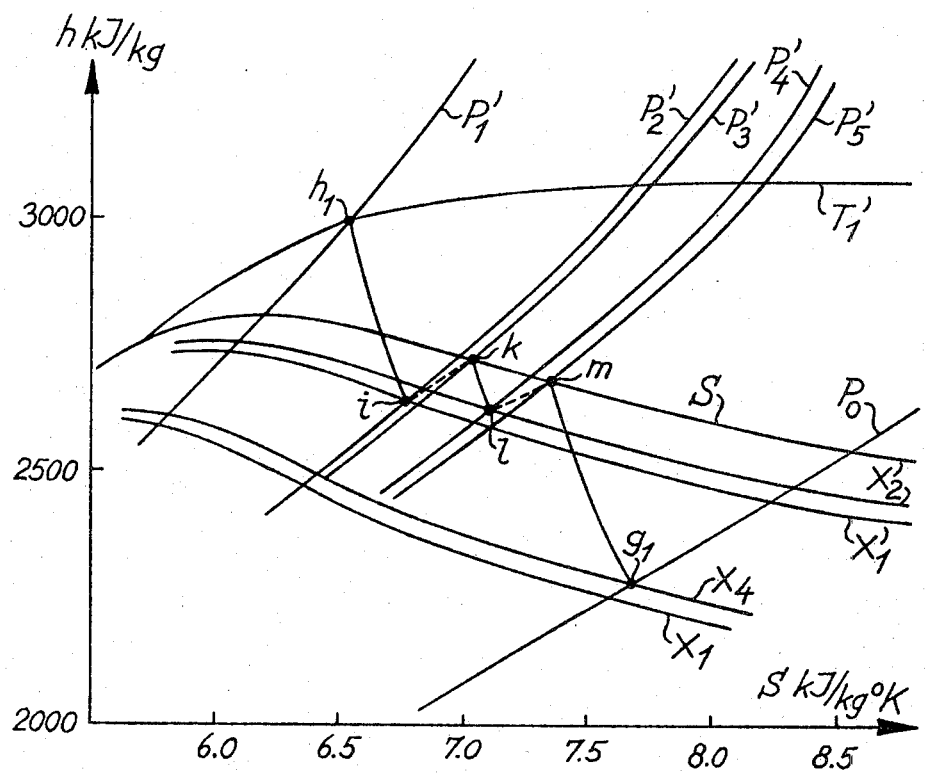

The invention will now be described with reference to the accompanying drawing in which FIGURE 1 is a diagrammatic illustration of an embodiment of a steam turbine plant according to the invention, FIGURE 2 is a Mollier diagram for the plant shown in FIGURE 1, illustrating the operation of the plant in comparison with a plant having a single reheating cycle, FIGURE 3 is a part of the Mollier diagram of FIGURE 2, illustrating how the losses of the power plant vary in response to the operating conditions of the distillation or evaporation plant, FIGURE 4 is a diagrammatic illustration of the reduction in the turbine yield, power consumption for the distillation plant, circulation pump and total power consumption as a function of the recirculation ratio of the distillation plant, FIGURE 5 is a diagrammatic illustration of another embodiment of a power plant according to the invention and FIGURE 6 is a Mollier diagram for the plant shown in FIGURE 5.

In broad terms the power plants illustrated in FIGURES 1 and 5 comprise a steam generator T adapted to supply superheated steam to a turbine plant having a plurality of cylinders, in the examples illustrated a high-pressure turbine cylinder HP, an intermediate turbine cylinder IP and a low-pressure turbine cylinder LP. Between at least two of the cylinders (in FIGURE 1 between the IP-cylinder and the LP-cylinder and in FIGURE 5 between each of the cylinders) a distillation or evaporation plant 40 (FIGURE 1) is provided and connected with the preceding cylinder (in FIGURE 1 with the IP-cylinder) to condense substantially all the output steam from the preceding cylinder and being operable to produce a relatively corresponding amount of steam to be supplied to the succeeding cylinder.

In more detail, with reference to FIGURE 1 the high-pressure cylinder HP and the intermediate-pressure turbine cylinder IP are connected in conventional manner with bleed points 14 and 16 from the HP turbine cylinder and 18 and 20 from the IP turbine cylinder to a system of pre-heaters 22, 24, 26 and 28 adapted to preheat the feed-water which is returned to the steam generator through pipes 34 and 36 in the direction of the arrows shown.

The super-heated steam which may have a temperature of for example 540° C. and a pressure of 170 bar is in a condition which is substantially above the saturation line of a Mollier diagram. The turbine is a condensation type turbine which usually must be operated in such a manner that the steam is expanded to about a pressure of .03 bar. Provided the adiabatic efficiency of the turbine plant is about .82 it is possible to see from the Mollier diagram that the exhaust steam from the LP-turbine will have a wetness of about 15% which is substantially more than allowable.

In order to avoid this it is usual in modern power plants to provide a reheating cycle between the HP-turbine cylinder and the IP-turbine cylinder, for example by reheating the steam to 540° C. The reheating gives rise to a loss of pressure, for example from 30 bar to 27 bar. In addition such reheating equipment requires relatively large capital expenses and results in a thermodynamic loss as illustrated by the pressure loss mentioned above.

Instead of reheating it is possible to effect extraction of the water in the stream, for example by providing separators between two or more of the turbine cylinders. In this way it is also possible to keep the wetness of the steam within satisfactory limits.

Within steam generators which are not capable of supplying super-heated steam which will for example normally be the case in atomic power plants, the steam supplied to the HP-turbine cylinder is only slightly super-heated and is therefore only slightly over the saturation line in a Mollier diagram. In such an event it will often be necessary to use water separators at a plurality of points during the passage of the seam through the turbine plant. Water separators give rise to losses in the same manner as reheaters.

In FIGURE 1, 40 is a distillation plant adapted to produce distilled water from water. As shown in FIGURE 1 the distillation plant 40 is connected with the outlet from the IP-cylinder in such a manner that the entire amount of outlet steam therefrom is supplied to the distillation plant 40 through a pipe 48. The distillation plant includes a heat exchanger 42 in which the steam is condensed and is supplied back to the steam generator 10 as feed water through a pipe 50 which is included with the feed-water pipes 34 and 36 in the form of a closed system.

Water is supplied to the distillation plant through a pipe 52 in which preheaters 30 and 32 are included and from which the water is supplied to the distillation plant through a pipe 54. In the distillation plant, a circulation pump 46 recirculates the water through a heat exchanger 42 in such a manner that in the evaporator 44 of the distillation plant an amount of steam is produced which is very near to the amount of the steam which is condensed in the heat exchanger. This amount of steam is supplied to the low-pressure turbine cylinder LP through a pipe 56.

A minor part of the steam is branched off through a bleed line 58 to a pipe 60 which is connected with the pre-heaters 30 and 32 and a further bleed line 62 from the LP-turbine cylinder is connected with the pipe 60 between these pre-heaters.

Apart from the minor part of the steam which is taken to the pre-heaters 30 and 32 through the bleed lines the main portion of the steam is expanded in the LP-turbine cylinder and is taken out from the outlet side thereof to a condenser 66 through a pipe 64. Cooling water which is pumped through the condenser 66 from a pipe 68 leaves the condenser through an outlet pipe 70 from which the water supply to the distillation plant is branched off so that the feed water for the distillation plant is preheated in the condenser 66 as well as in the pre-heaters 30 and 32.

The condenser which is distilled water is taken out through an outlet pipe 76. In the embodiment shown an additional preheater 74 is interposed between the outlet line 76 and the feed water supply line 52.

The minor amount of bleed steam which is taken through the pipes 58 and 62 and condensed in the pre-heaters 30 and 32 is also taken out as distilled water from the pipe 60.

The mode of operation and the operating conditions of the plant will be described in the following with reference to the Mollier diagram of FIGURE 2.

EXAMPLE I

In the Mollier diagram the entropy is the abscissa and the enthalpy is the ordinate. The curve S is the saturating line of the steam. The line T is the temperature line for the superheated steam. The line $P_0$ is the pressure line for the pressure in the condenser 66 and the line $X_1$ is that dryness fraction line which corresponds to the maximum wetness of the steam allowable in the turbine.

In the following it is assumed that the turbine plant is a plant adapted to produce 125,000 kw. and is supplied with superheated steam at a temperature of 540° C. and a pressure of 170 bar. The plant includes 6 stages of feed water pre-heating.

The condensate which passes through the pipe 50 to the preheater 28 has substantially the same temperature as in the pipe 48 and assuming that the saturation temperature of the steam in the bleed lines 20, 18, 16 and 14 is approximately 155° C., 187° C., 221° C. and 255° C. respectively, the feed water which is returned through the pipe 36 to the steam generator may be preheated to approximately 245° C.

It is further assumed that the outlet steam from the high-pressure turbine cylinder HP has a temperature of approximately 300° C. and a pressure of approximately 30 bar.

The initial condition of the steam is determined by the point $a$ which is the intersection point between the temperature line T for 540° C. and the pressure line $P_1$ for 170 bar. At the outlet of the high-pressure turbine cylinder HP the condition is determined by the point $b$ which is the intersection point between a temperature line $T_1$ corresponding to 300° C. and a pressure line $P_2$ for 30 bar.

In order to compare the present invntion with a plant in which reheating is used, such reheating is in the Mollier diagram shown in the form of single stage reheating after the outlet from the IP-turbine cylinder from the point $b$ following the line R to a point $c$ which corresponds to 540° C. and 27 bar, it being assumed that the reheating results in a pressure drop of 3 bar. In the Mollier diagram the point $c$ is therefore the intersection point between the temperature line T of 540° C. and a pressure line $P_3$ for 27 bar.

In a plant having a single stage reheating after the HP-turbine cylinder the steam may be passed through the IP-turbine and LP-turbine cylinders in series and it is assumed that from the reheating point $c$ to the outlet point $d$ from the LP-turbine cylinder there is a temperature drop and a pressure drop to 25° C. and .03 bar respectively and that the steam leaves the LP-turbine with a wetness fraction of 6% whereby the point $d$ is the intersection between the line $P_0$ previously designating the condenser pressure and a dryness fraction line $X_2$ for a dryness fraction of 94%.

From these operating conditions which substantially correspond to practical conditions in plants of this type it can be calculated that the thermal efficiency of the plant is approximately 44.3% excluding the losses in the steam generator, the main steam lines and the energy consumption of the feed water pumps.

In the plant of FIGURE 1 the HP-cylinder and the IP-cylinder are connected in series and as shown in the Mollier diagram of FIGURE 2 the line between the points $a$ and $b$ continues directly to the point $e$ which illustrates the steam condition at the outlet of the IP-cylinder in which it is assumed that the temperature is 106° C. and the pressure 1.25 bar and with a wetness fraction of 7%. Hereby the point $e$ is determined as the intersection between a pressure line $P_4$ for 1.25 bar and a dryness fraction line $X_3$ for 93% dryness.

At this point there is in the Mollier diagram in the plant of FIGURE 1 a jump to the point $f$ represented by the dotted line which symbolizes the distillation. It is assumed that the distillation plant is adapted to operate with a small temperature difference, for example 5° C., whereby dry saturated steam is produced in the distillation plant with a temperature of 101° C. and a pressure of 1.05 bar. Hereby the point $f$ is the intersection point between the saturation line S and a pressure line $P_5$ for 1.05 bar.

The steam produced in the distillation plant is supplied to the LP-turbine cylinder and has at the outlet thereform the same temperature and pressure as at the point $d$ which means that at the outlet point $g$ there is a pressure of .03 bar and a temperature of 25° C. with a wetness fraction of 11% whereby the point $g$ is the intersection between the condenser pressure line $P_0$ and a dryness fraction line $X_4$ for 89% dryness.

From these operating conditions it can—using the same basis of calculation and on the same assumption as above—be calculated that the thermal efficiency of the plant is approximately 44% compared with the plant in which reheating is used.

In the plant according to the invention, however, the distillation plant has produced a substantial amount of distilled water which can be calculated to be about 2.4 kilo per kw.h. produced by the power plant. Since it was assumed that the output of the power plant was 125,000 kw. this means that approximately 350 tons water have been produced per hour and that this amount of water has been produced substantially without decreasing its efficiency of the entire plant.

The distillation plant should be dimensioned with such a circulation ratio, i.e. a ratio between the amount of water by weight circulated per time unit and the weight of steam produced during the same time unit that it is possible to run the distillation plant with a small temperature difference, preferably not higher than 100° C. This requires a relatively large circulation ratio which normally will be between 300–1500, preferably about 600 in which range it can be shown that an economic steam production can be obtained.

This is illustrated by the part of the Mollier diagram shown in FIGURE 3 which illustrates the conditions between the points $e$, $f$ and $g$.

If—which of course is impossible—the distillation plant could operate without any temperature drop and pressure drop the starting condition at the inlet of the LP-turbine cylinder will be represented by the point $f_0$ and the condition at the outlet will be represented by the point $g_0$.

The points $f$ and $g$ are the actual points according to Example I and as illustrated in the Mollier diagram of FIGURE 2 and as indicated in FIGURE 3 this provides for losses $\Delta h_1$ plus $\Delta h_2$.

If, as indicated in dot and dash, the distillation plant operates with a substantially larger temperature and pressure drop, for example a pressure to a pressure line $P''_5$ the condition at the inlet of the LP-turbine cylinder will be represented by the point $f_1$ and the outlet will be represented by the point $g_1$, whereby substantially larger losses, namely $\Delta h_3$ plus $\Delta h_4$ will result.

These losses in the power plant are equivalent to an energy consumption of the distillation plant. It can be calculated that these losses, as a function of the circulation ratio, will follow a curve shaped like the curve A in FIGURE 4. Obviously when increasing the recirculation ratio the energy necessary for operating the pump of the distillation plant will increase and it can be calculated that the energy consumption will follow a curve like the curve B of FIGURE 4 whereby the resulting curve which represents the energy consumption will be like the curve C with a minimum in the range between a recirculation ratio of 300–1500 as hereinbefore mentioned.

At the minimum of the curve C the energy consumption of the pump may be of the magnitude of 3 kw.h. per ton water produced. Obviously the electricity supplied to a distillation plant included in a power plant in the manner hereinbefore described is a basic load of the power plant like any other equipment used therein and will be at the cheapest possible rate.

As is obvious from the foregoing comparison with the plant including reheating, the reheating equipment of the traditional plant is avoided. Furthermore the IP-turbine cylinder can be constructed cheaper insofar as it operates at a lower temperature.

In addition the feed water circuit is completely closed and insofar as the outlet pressure from the IP-cylinder normally can be selected above atmospheric pressure this means that the operation pressure in the feed water circuit nowhere is below atmospheric pressure so that it will not be necessary to include means for preventing air entering the system or remove air which has entered the system.

Furthermore there is plenty of distilled water available as make-up water so that special equipment for producing such make-up water is avoided.

By using the forced circulation with the large recirculation and a small temperature difference the boiling is more gentle so that the steam will be very pure.

In the embodiment of FIGURE 5 two distillation plants are provided in the power plant, one generally referred to by 90 between the HP-turbine cylinder and the IP-turbine cylinder and one referred to by 110 between the IP-turbine cylinder and the LP-turbine cylinder.

From the outlet of the HP-turbine cylinder the steam is supplied through a pipe 80 to the heat exchanger 92 of the distillation plant 90 and from the outlet of the heat exchanger, the condensate is supplied through a pipe 82 to the return pipe 34a for feed water to the steam generator 10. To the pre-heaters 22 and 24 which correspond to the pre-heaters of FIGURE 1, bleed lines 14 and 16 are connected from the HP-turbine cylinder. The feed water is fed back through the pipe 36 as in FIGURE 1.

From the distillation plant 90 an outlet pipe 94 supplies the steam to the IP-turbine cylinder from the outlet side of which the steam is supplied through a pipe 100 to the heat exchanger 112 in the distillation plant 110. From the outlet of the heat exchanger 112 the condensate is supplied through a pipe 102 to an outlet pipe 60a which continues in an output pipe 60b.

In a corresponding manner to that of FIGURE 1 the outlet side of the distillation plant 110 is connected through a pipe 114 with the input of the LP-turbine cylinder, the output of which is connected through a pipe 64 with the condenser 66 so that the distilled water is taken out through a pipe 76.

As in FIGURE 1 the condenser is supplied with water through a pipe 68. A part of the cooling water is branched off from the line 70 and is supplied through a supply pipe 72 to the distillation plants for which purpose the pipe 72 has a branch 74 to the distillation plant 110 and a branch 76 to the distillation plant 90.

In the feed water pipe 72 pre-heaters 26, 28, 30 and 32 are included in a similar manner as in FIGURE 1. These preheaters are also included in the outlet pipes 60a and 60b to which bleed lines 18 and 20 as well as 122 and 124 lead from the IP-turbine cylinder and the LP-turbine cylinder respectively.

The mode of operation and operating conditions of the plant according to FIGURE 5 will be described in the following with reference to the Mollier diagram of FIGURE 6.

EXAMPLE II

It is assumed that the steam generator which may be in the form of a nuclear reactor supplies only relatively slightly super-heated steam, for example at 300° C. and 30 bar corresponding to the initial condition and the point $h_1$ which is the intersection point between the temperature line $T'_1$ corresponding to the temperature 300° C. and a pressure line $P'_1$ corresponding to 30 bar. As is apparent from FIGURE 6 this initial condition is above the saturation line S but not as much as in FIGURE 2. The condition is changed following the lines between the points $h$ and $i$ and at the outlet of the HP-turbine cylinder the steam comes out with a temperature of for example 134° C., a pressure of 3 bar and a wetness fraction of 4% which means that $i$ is the intersection line between a pressure line $P'_2$ corresponding to 3 bar and a dryness fraction line $X'_1$ corresponding to 9%.

The dotted line between the points $i$ and $k$ symbolizes the distillation in the plant 90. It is assumed that the plant 90 operates with a temperature difference of 4° C. whereby the inlet steam for the IP-turbine cylinder at the point $k$ will have a temperature of 130° C. and a pressure of 2.7 bar. Since the point $k$ in similarity with the point $f$ of the Mollier diagram of FIGURE 2 is on the saturation line this means that the steam is a dry saturated steam. The point $k$ is the intersection between the saturation line and a pressure line $P'_3$ of 2.7 bar.

The line between the points $k$ and $l$ represents the change of condition of the steam during its passage through the IP-turbine cylinder and it is assumed that the steam leaves the IP-turbine cylinder with a temperature of 106° C. and a pressure of 1.25 bar with a wetness of 3.5%. This means that the point $l$ is the intersection between a pressure line $P'_4$ corresponding to 1.25 bar and a dryness fraction line $X'_2$ corresponding to 96.5%.

The dotted line between the points $l$ and $m$ of FIGURE 6 represents the distillation of the plant 110 which is assumed to operate with a temperature difference of 5° C. so that the inlet temperature and pressure for the LP-turbine cylinder is the same as in Example I, namely 101° C. and 1.05 bar corresponding to intersection between the saturation line S and the pressure line $P_5$ of 1.05 bar which in FIGURE 6 is referred to by $P'_5$.

The steam production at the outlet of the LP-turbine cylinder is assumed to be the same as in Example I, namely 25° C. and 0.03 bar with a wetness fraction of 11% corresponding to the same point $g$ as in Example I where the point in FIGURE 6 is referred to by $g'$ and the intersection between the pressure line P and a dryness fraction line $X_4$ which corresponds to 89%.

By using two distillation plants as in FIGURE 5 approximately double the amount of distilled water compared with Example I is produced.

As is apparent from the foregoing the invention enables the production of distilled water substantially without decreasing the thermal efficiency of the entire power plant.

Obviously the saving obtained by avoiding the reheating equipment or separators requires capital costs for installing the distillation plant or plants, but due to the economy of the system as hereinbefore described this means that apart from the capital costs involved in installing the distillation plant or plants the distilled water production is obtained substantially without any operation costs. Only the circulation pump and a few minor auxiliary pumps which are necessary will consume energy at a total of approximately 3–4 kw.h. per cubic-meter distilled water.

Though in the foregoing the invention is described with reference to a plant or plants for producing distilled water from water as a substitute for such other equipment as reheaters or water separators which in traditional plants may be used for retaining the wetness of the steam below limits which otherwise will result in damage such as corrosion of the turbine blades, it will be understood that it is possible, within the scope of the invention, to use evaporation plants for other aqueous fluids for example aqueous fluids containing solid material in solution or dispersion whereby in addition to the distilled water produced by the evaporation a concentrate of the solid material can be obtained.

In such an event, depending on the osmotic boiling point elevation of the solution, it may be necessary to operate the evaporation plant with a somewhat larger temperature difference than the temperature difference of 4–5° C. which is described in the foregoing examples.

It may be a question of a compromise whether it will be more advantageous to calculate with a somewhat lower yield of the evaporation plant or a somewhat slight decrease in the efficiency of the entire power plant which will depend on the price of the concentrated product obtained from the evaporation plant in addition to the distilled water produced.

What is claimed is:

1. In a power plant having a steam generator operable to produce super-heated steam and a turbine plant having a plurality of turbine cylinders including a plurality of cylinders connected in series and in each of which the steam is expanded under decreased pressure conditions as seen from the steam generator in combination: a series connection of cylinders operable to effectively utilize the steam expansion until a wetness fraction of the steam at the outlet of a first cylinder, which is unallowable for the next following second cylinder; an equipment including heat exchanger means, evaporator means and means operable to circulate an aqueous fluid medium through said heat exchanger means to produce steam in said evaporator means in response to heat supplied to said heat exchanger means, means operatively connecting said heat exchanger means with said outlet of said first cylinder to supply substantially the entire amount of outlet steam from said first cylinder to said heat exchanger of said equipment to be condensed in said heat exchanger, and thereby supply heat to produce steam in said heat exchanger, means operable to feed said condensate from said heat exchanger back to said steam generator as feed water, preheater means included in said feed water means, including bleed lines from said series connection of cylinders for effectively increasing the temperature of said condensate during its passage through said feed water means from said condenser to said steam generator, means operatively connecting said evaporator means of said equipment with said second cylinder for supplying substantially all the steam produced in said equipment as inlet steam to said second turbine cylinder; condenser means; means operatively connecting the last of said plurality of turbine cylinders with said condenser means to condense substantially all the outlet steam from said last cylinder in said condenser means; means operable to recover the condensate from said condenser to be taken out as distilled water; cooling water means for said condenser; means operable to branch off a portion of said cooling water to supply said water portion to said equipment as feed water; preheater means included in said feed water supply means; bleed line means from said turbine plant which follows said equipment to increase the temperature of said feed water during the passage of said feed water means; and means operable to circulate the water in said equipment with a relatively high circulation ratio to thereby provide a small temperature difference between the inlet steam to and the outlet steam from said equipment.

2. A power plant having a steam generator operable to produce super-heated steam and a turbine plant having a plurality of turbine cylinders including a high pressure cylinder, an intermediate pressure cylinder, and a low pressure cylinder; means for supplying said super-heated steam from said steam generator as inlet steam to said high pressure cylinder; means operable to supply outlet steam of reduced temperature and pressure from said high pressure cylinder as inlet steam to said intermediate pressure cylinder; an equipment including heat exchanger means and means operable to produce steam in response to circulation of an aqueous fluid medium through said heat exchanger; means operable to supply substantially the entire amount of outlet steam from said intermediate pressure cylinder to heat exchanger of said equipment to be condensed in said heat exchanger; means operable to feed said condensate from said heat exchanger back to said steam generator as feed water, a plurality of preheaters included in said feed water means, a plurality of bleed lines from said high pressure and said intermediate pressure cylinders operatively connected with said preheater means for effectively increasing the temperature of said condensate during its passage through said feed water means from said heat exchanger to said steam generator; means for supplying substantially all the steam produced in said equipment as inlet steam to said low pressure turbine; condenser means; means operatively connecting said low pressure turbine with said condenser means to condense substantially all the outlet steam from said low pressure turbine in said condenser means; means operable to recover the condensate from said condenser to be taken out as distilled water; cooling water means for said condenser; means operable to branch off a portion of said cooling water; means operatively connecting said branched-off means with said equipment to supply said water fraction to said equipment as feed water; preheater means included in said feed water supply means; bleed line means from said low pressure turbine to said preheater means included in said feed water means operable to increase the temperature of said feed water during the passage of said feed water means, and means operable to circulate the water in said equipment with a relatively high circulation ratio to thereby provide a small temperature difference between the inlet steam to and the outlet steam from said equipment.

3. A power plant having a steam generator operable to produce dry saturated but only slightly super-heated steam and a plurality of turbine cylinders including a high pressure cylinder, and intermediate pressure cylinder and a low pressure cylinder, means for supplying said steam from said steam generator as inlet steam to said high pressure cylinder; a first equipment including heat exchanger means and means operable to produce steam in response to circulation of an aqueous fluid medium through said heat exchanger means; means operable to supply substantially the entire amount of outlet steam from said high pressure cylinder to the heat exchanger of said first equipment to be condensed in said heat exchanger; means operable to feed said condensate from said heat exchanger back to said steam generator as feed water, a plurality of preheaters included in said feed water means; a plurality of bleed lines from said high pressure cylinder operatively connected with said preheater means for effectively increasing the temperature of said condensate during its passage through said feed water means from said condenser to said steam generator; means for supplying substantially all the steam produced in said first equipment as inlet steam to said intermediate pressure turbine; a second equipment including heat exchanger means and means operable to produce steam in response to circulation of an aqueous fluid medium through said heat exchanger means thereof; means operable to supply substantially the entire amount of outlet steam from said intermediate pressure cylinder to the heat exchanger of said second equipment to be condensed in said heat exchanger; means for supplying substantially all the steam produced in said second equipment as inlet steam to said low pressure turbine; condenser means; means operatively connecting said low pressure turbine with said condenser means to condense substantially all the outlet steam from said low pressure turbine in said condenser means; means operable to recover the condensate from said condenser to be taken out as distilled water; means operable to recover the condensate from both said equipments as distilled water; cooling water means for said condenser; means operable to branch off a portion of said cooling water; means operatively connecting said branch off means with said first and said second equipment to supply said water portion to said equipments as feed water; preheater means included in said feed water supply means; feed line means from said intermediate pressure and said low pressure turbines to said preheater means included in said feed water during the passage of said feed water means; and means operable to circulate the water in both said equipments with a relatively high circulation ratio to thereby provide a small temperature difference between the inlet steam to and the outlet steam from both said equipments.

4. In a nuclear reactor plant having a steam generator operable to produce only slightly superheated saturated steam and a turbine plant having turbine cylinders including a high pressure cylinder, and intermediate pressure cylinder and a low pressure cylinder; means for supplying said steam from said steam generator as an inlet stream to said high pressure cylinder; a first equipment including heat exchanger means and means operable to produce steam in response to circulation of an aqueous fluid medium through said heat exchanger; means operable to supply substantially the entire amount of outlet steam from said high pressure cylinder to the heat exchanger of said first equipment to be condensed in said heat exchanger; means operable to feed said condensate from said heat exchanger back to said steam generator as feed water; preheater means included in said feed water means; means for supplying substantially all the steam produced in said first equipment as inlet steam to said intermediate pressure turbine; a second equipment including heat exchanger means and means operable to produce steam in response to recirculation of an aqueous fluid medium through said heat exchanger; means operable to supply substantially the entire amount of said outlet steam from said intermediate pressure cylinder to the heat exchanger of said second equipment to be condensed in said heat exchanger; means for supplying substantially all the steam produced in said second equipment as inlet steam to said low pressure turbine; condenser means; means operatively connecting said low pressure turbine with said condenser means to condense substantially all the outlet steam from said low pressure turbine in said condenser means; means operable to recover the condensate from said condenser to be taken out as distilled water; means operable to recover the condensate from both said equipments as distilled water; cooling water means for said condenser; means operable to supply a portion of said cooling water as feed water to both said equipments; preheater means included in said feed water supply means; and means operable to circulate the water in both said equipments with a relatively high circulation ratio to thereby provide a small temperature difference between the inlet steam to and the outlet steam from said equipments.

5. A distillation and power plant comprising: a first steam generator means for generating first steam from first water; a first turbine means for operation by steam; first conduit means to supply said first steam to said first turbine for operation thereof; first heat exchanger means for receiving the outlet first steam from said first turbine means and condensing it; means for supplying second water to said first heat exchanger completely separate from said first water; said heat exchanger means evaporating said second water to form a corresponding amount of substantially dry second steam by the heat of condensation of said first steam; second turbine means for operation by steam; second conduit means for supplying said second steam to said second turbine means for operation thereof; second heat exchanger means for receiving the outlet second steam from said second turbine means and condensing it to produce distilled second water; means for removing said distilled water for use outside of said distillation and power plant.

6. The distillation and power plant according to claim 5, including means for returning the first water condensed by said first heat exchanger means back to the inlet of said first steam generator means.

7. The device according to claim 6, wherein said means for returning the first water completes a closed cycle for the first water.

8. The device of claim 5, wherein said first heat exchanger means operates above atmospheric pressure.

9. The device of claim 5, including means for conducting cooling water through said second heat exchanger means for condensing the second water; and said means for supplying the second water to said first heat exchanger means obtaining said second water from the outlet cooling water of said second heat exchanger means.

10. The device of claim 5, including water preheaters within said means for supplying the second water to preheat second water before it enters said first heat exchanger means; and bleed lines connected from said second turbine means to said preheaters.

11. The device of claim 10, including means for removing bleed second water from said preheaters as distilled water for use outside of said distillation and power plant.

12. The device of claim 7, including preheater means for preheating the condensate in said means for returning said first water to said first steam generator means; and means for bleeding steam from said first turbine means to said last mentioned preheater means.

13. The device of claim 5, including means for producing a forced circulation of the first water, first steam, second water and second steam.

14. The device of claim 13, wherein said means for producing forced circulation has a rate of fluid by weight circulated per time unit and steam by weight produced during the same time unit for said first heat exchanger means that is designed for a small temperature differential between the inlet first steam and the outlet second steam.

15. The device of claim 14, wherein said temperature differential is between 4 and 5° C.

16. The device of claim 14, wherein said rate ratio is within the range of 300–1500.

17. The device of claim 5, wherein said first steam generator means produces superheated first steam; said first turbine means including a high pressure turbine cylinder and an intermediate pressure turbine cylinder; said second turbine means including a low pressure turbine cylinder; said turbine cylinders being arranged in series and said first heat exchanger being operatively connected between said intermediate pressure turbine cylinder and said low pressure turbine cylinder.

18. The device of claim 7, wherein said first heat exchanger means operates above atmospheric pressure.

19. The device of claim 18, including means for conducting cooling water through said second heat exchanger means for condensing the second water; and said means for supplying the second water to said first heat exchanger means obtaining said second water from the outlet cooling water of said second heat exchanger means.

20. The device of claim 19, including water preheaters within said means for supplying the second water to preheat said second water before it enters said first heat exchanger means; and bleed lines connected from said second turbine means to said preheaters.

21. The device of claim 20, including means for removing bleed second water from said preheaters as distilled water for use outside of said distillation and power plant.

22. The device of claim 21, including preheater means for preheating the condensate in said means for returning said first water to said first steam generator means; and means for bleeding steam from said first turbine means to said last mentioned preheater means.

23. The device of claim 22, including means for producing a forced circulation of the first water, first steam, second water and second steam.

24. The device of claim 23, wherein said means for producing forced circulation has a rate of fluid by weight circulated per time unit and steam by weight produced during the same time unit for said first heat exchanger means that is designed for a small temperature differential between the inlet first steam and the outlet second steam.

25. The device of claim 24, wherein said temperature differential is between 4 and 5° C.

26. The device of claim 25, wherein said rate ratio is within the range of 300–1500.

27. The device of claim 26, wherein said first steam generator means produces superheated first steam; said first turbine means including a high pressure turbine cylinder and an intermediate pressure turbine cylinder; said second turbine means including a low pressure turbine cylinder; said turbine cylinders being arranged in series and said first heat exchanger being operatively connected between said intermediate pressure turbine cylinder and said low pressure turbine cylinder.

28. The method of producing distilled water in a power plant having a steam generator and a turbine plant with a plurality of turbine cylinders operable at relatively different steam pressures, comprising the steps of: supplying a first steam from said steam generator to a turbine cylinder operable at a relatively high pressure; withdrawing substantially the entire amount of outlet first steam from said higher pressure cylinder; condensing said withdrawn steam; and producing a relatively corresponding amount of second separate steam by utilizing the condensation heat of the first steam; supplying said second steam to a following turbine cylinder of relatively lower pressure; withdrawing substantially the entire amount of outlet second steam from said lower pressure cylinder; and eventually condensing said withdrawn second steam into the form of distilled water and withdrawing said distilled water for use outside of said power plant.

29. The method according to claim 28, wherein the steps of condensing the first steam and producing the second steam are conducted at a pressure above atmospheric pressure.

30. The method according to claim 29, wherein the steps of condensing the second steam uses raw supply cooling water, and said step of producing second steam uses at least a portion of the raw supply cooling water after it has passed through the last mentioned steps of condensing.

31. The method according to claim 30, including the step of circulating said first steam and its condensate in a closed cycle.

32. The method according to claim 31, including the step of recirculating the raw cooling water at a high recirculation ratio relative to the first steam and using a relatively low temperature differential between the recirculated raw cooling water and the first steam during the steps of producing the second steam and condensing the first steam.

33. The method according to claim 32, wherein said step of recirculating is conducted at a recirculation ratio between 300 and 1500 and a temperature difference of four to five degrees C.

34. The method according to claim 28, including the steps of condensing the second steam by means of cooling water; withdrawing a part of the cooling water after said last mentioned step and using the withdrawn cooling water in the step of producing said second steam by evaporating the withdrawn cooling water; withdrawing a steam fraction by bleeding from the turbine cylinder relatively low pressure in the form of bleed steam at a point remote from the outlet of the relatively low pressure turbine cylinder; preheating the water fraction by means of the bleed stream; removing the bleed steam after the step of preheating in the form of distilled water for use outside of the power plant.

35. The method according to claim 28, wherein the steps of condensing the second steam uses raw supply cooling water, and said step of producing second steam uses at least a portion of the raw supply cooling water after it has passed through the last mentioned steps of condensing.

36. The method according to claim 28, including the step of circulating said first steam and its condensate in a closed cycle.

37. The method according to claim 36, including the step of recirculating the raw cooling water at a high recirculation ratio relative to the first steam and using a relatively low temperature differential between the recirculated raw cooling water and the first steam during the steps of producing the second steam and condensing the first steam.

38. The method according to claim 37, wherein said step of recirculating is conducted at a recirculation ratio between 300 and 1500 and a temperature difference of four to five degrees C.

References Cited

UNITED STATES PATENTS

| | | | |
|---|---|---|---|
| 1,632,575 | 6/1927 | Abendroth | 60—73 X |
| 1,993,585 | 3/1935 | Baumann et al. | 60—49 X |
| 2,235,541 | 3/1941 | Warren | 60—67 X |
| 3,147,598 | 9/1964 | Wilson | 60—108 X |

FOREIGN PATENTS 532,909  2/1941  Great Britain.

MARTIN P. SCHWADRON, *Primary Examiner.*

ROBERT R. BUNEVICH, *Examiner.*